United States Patent [19]

Feeney et al.

[11] 4,157,319

[45] Jun. 5, 1979

[54] ADHESIVE COMPOSITION AND BUTADIENE, STYRENE, ACRYLONITRILE COPOLYMER THEREFOR

[75] Inventors: George W. Feeney, Akron; Gary L. Burroway, Doylestown, both of Ohio

[73] Assignee: The Goodyear Tire & Rubber Company, Akron, Ohio

[21] Appl. No.: 803,490

[22] Filed: Jun. 6, 1977

Related U.S. Application Data

[62] Division of Ser. No. 688,642, May 21, 1976, Pat. No. 4,052,483, which is a division of Ser. No. 528,299, Nov. 29, 1974, Pat. No. 3,970,623.

[51] Int. Cl.$^2$ .................. C08L 7/00; C08L 51/00; C08L 47/00; C08L 53/00
[52] U.S. Cl. .................. 260/27 BB; 260/5; 260/33.6 UA; 260/876 R; 260/880 R; 260/880 B; 260/888; 260/889; 156/327; 526/66; 526/79; 526/86; 526/87; 526/224; 526/338; 526/340; 526/342
[58] Field of Search .................. 260/5, 27 BB, 876 R, 260/880 B, 880 R; 526/338

[56] References Cited

U.S. PATENT DOCUMENTS

| | | | |
|---|---|---|---|
| 2,611,719 | 9/1952 | Borders | 260/27 BB |
| 2,643,235 | 6/1953 | Brams | 260/27 BB |
| 2,649,425 | 8/1953 | Hulse | 260/27 BB |
| 2,713,566 | 7/1955 | Reid | 426/338 |
| 2,802,808 | 8/1957 | Hayes | 260/880 R |
| 2,854,439 | 9/1958 | Slocombe et al. | 526/338 |
| 2,894,924 | 7/1959 | Rockoff | 260/27 BB |
| 3,118,854 | 1/1964 | Hess et al. | 526/338 |
| 3,213,159 | 10/1965 | Adomaitis | 260/876 |
| 3,226,371 | 12/1965 | Garvey et al. | 526/338 |
| 3,787,531 | 1/1974 | Dahlquist et al. | 260/27 BB |

*Primary Examiner*—Herbert J. Lilling
*Attorney, Agent, or Firm*—H. C. Young, Jr.

[57] ABSTRACT

A rubbery copolymer of butadiene, styrene and acrylonitrile, if desired, with a tensile strength of about 50 to about 100 psig containing a minor amount of styrene, particularly in combination with selective tackifier resins. Said copolymer is preferably prepared by a stepwise aqueous emulsion polymerization with styrene and modifier being incrementally added. Said rubbery copolymer/tackifier mixture is particularly useful as an adhesive.

3 Claims, No Drawings

ADHESIVE COMPOSITION AND BUTADIENE, STYRENE, ACRYLONITRILE COPOLYMER THEREFOR

This is a division of application Ser. No. 688,642 filed, May 21, 1976 now U.S. Pat. No. 4,052,483, which is a division of Ser. No. 528,299, filed Nov. 29, 1974, now U.S. Pat. No. 3,970,623, issued July 20, 1976.

This invention relates to adhesive compositions. The invention particularly relates to pressure-sensitive adhesive compositions.

Adhesives are many times based on mixtures of rubbery materials and tackifiers. Pressure-sensitive adhesives typically require more sophisticated properties than simple tackified rubber compositions. They must have especially balanced properties of adhesion, cohesion and elasticity in addition to peel and shear strengths to be useful for adhering materials together on a pressure-sensitive basis. Typically, pressure-sensitive adhesives can be based on mixtures of tackifiers with natural rubber or with unvulcanized block copolymers of butadiene and styrene or isoprene and styrene in order to achieve the required properties. Generally, however, rubbery emulsion copolymers of butadiene and styrene are inferior to both natural rubber and unvulcanized block copolymers of butadiene and styrene for the purpose of providing the quality of tack normally required by pressure-sensitive adhesives.

It is therefore a particular object of this invention to provide an adhesive composition of a tackifier and a rubbery copolymer of butadiene and styrene and to provide such a rubber butadiene/styrene copolymer for this purpose.

In accordance with this invention, it has been discovered that an adhesive composition, suitable for a pressure-sensitive adhesive, comprises an admixture of 100 parts by weight of a rubber copolymer of butadiene, styrene and acrylonitrile, if desired, containing about 3 to about 12, preferably about 5 to about 10, weight percent units derived from styrene, about 97 to about 88, preferably about 95 to about 90, weight percent units derived from 1,3-butadiene and about 0 to about 4, preferably about 1 to about 2, weight percent units derived from acrylonitrile with about 50 to about 150 parts by weight of a tackifier resin selected primarily from rosin esters and olefin/diolefin copolymers containing about 5 to about 35 weight percent aromatic groups, where said rubbery copolymer is prepared by water emulsion copolymerizing a mixture of styrene, 1,3-butadiene and acrylonitrile, if desired.

In the practice of this invention, said rubbery copolymer is preferably prepared by the step-wise method which comprises (1) aqueous emulsion free radical polymerizing a monomer mixture comprising about 2 to about 9, preferably about 3 to about 8, weight percent styrene, about 97 to about 92, preferably about 96 to about 93, weight percent 1,3-butadiene and correspondingly about 1 to about 4, preferably about 1 to about 2, weight percent acrylonitrile in the presence of a mercaptan modifier, to a conversion of about 50 to about 75, preferably about 55 to about 70 weight percent of said monomers to a copolymer thereof, and (2) reacting an additional amount of about 2 to about 5, preferably about 3 to about 4, weight percent styrene, based on the total monomers used, in the presence of additional mercaptan modifier, with said copolymer to an extent of about 80 to about 98, preferably about 85 to about 95, weight percent conversion of the total monomers to a copolymer thereof.

The butadiene/styrene/acrylonitrile copolymer in this invention is preferably prepared by the step-wise method of manipulating styrene amount and addition. This method is especially needed for better control of copolymer low level physical properties and gel formation. Thereby, a relatively high conversion of monomers can be obtained (85–95 percent) in the manipulated system and solubility of the copolymer in the emulsion is enhanced due to substantially reduced styrene polymer blocks.

Surprisingly, a pressure-sensitive adhesive can be prepared in which the butadiene/styrene/acrylonitrile copolymer in this invention can be satisfactorily substituted for natural rubber.

The unvulcanized butadiene/styrene copolymer in this invention, prepared by aqueous emulsion copolymerization, is generally characterized by having a tensile strength of about 50 to about 100 pounds per square inch (psi) and an ultimate elongation in the range of about 600 to about 1200 percent at about 25° C. The copolymer can also be generally characterized by a Mooney plasticity of about 25 to about 85, a benzene solution viscosity at a 4 weight percent concentration at 25° C. of about 10 to about 100 centipoises (cps) and a hexane solution viscosity at a 10 weight percent concentration at 25° C. of about 200 to about 2000 cps.

In the preparation of the butadiene/styrene emulsion copolymer, an initial aqueous monomer emulsion is prepared which usually contains about 25 to about 50 weight percent monomer and, correspondingly, about 50 to about 75 percent water. Generally, in addition to such mixture, from about 2 to about 5 weight percent, based on the total mixture, of various emulsifiers and modifiers can be present which are generally well-known to those having skill in the emulsion polymerization art. The polymerization can generally be conducted at a temperature in the range of about 5° C. to about 50° C. for a period of about 8 to about 15 hours, with good mixing. After a conversion in the range of about 50 to about 80 weight percent, the additional styrene is incrementally added and the reaction is generally continued at a temperature in the range of about 5° C. to about 50° C. over a period of about 8 to about 15 hours with good mixing. Generally, the overall reaction is allowed to proceed to a conversion of the monomers in the range of about 75 to about 98 percent. In practice, about 50 to about 70 percent of the styrene is added initially with the remaining about 50 to about 30 percent used in the later incremental addition.

It is typically not desired for the conversion to proceed further than about 95 to about 98 percent since the emulsion itself is difficult to maintain. The reaction is then stopped by the addition of the short stop as is also well known to those having skill in the emulsion polymerization art. The copolymer is then recovered by evaporation of the water from the system and is recovered in the form of a solid, rubbery, sometimes rather sticky, physical mass.

Aside from the preferred manipulation of styrene monomer amount and delayed addition to achieve beneficial polymerization conditions, monomer conversion and low profile copolymer physical properties, the aqueous emulsion copolymerization is conducted primarily by conventional means. Although it can be accomplished by batch, preferably a continuous process is used. Various emulsifiers can be used such as tall oil derivatives and the rosin acid type, particularly substantially or fully hydrogenated rosin acids. Various antioxidants are generally added such as the phosphite-types, phenol-types and amine-types, as well as particularly mixtures of phosphite and phenol-types of antioxidants. Modifiers are added to control copolymer chain length such as primary and tertiary mercaptans containing about 8 to about 16 carbons, particularly mixtures of such mercaptans containing about 10 to about 40 weight percent primary and, correspondingly, about 90 to about 60 weight percent tertiary mercaptans. Representative of such modifiers are primary octyl mercaptan, primary hexadecyl mercaptan, tertiary octyl mercaptan and tertiary dodecyl mercaptan. Various shortstops can be used to stop the copolymerization reaction representative of which are hydroquinone, sodium nitrite, diethyl hydroxyl amine and sodium dimethyl dithiocarbamate. The copolymerization can be catalyzed by various free radical catalysts such as organic hydroperoxide, inorganic peroxides and the azoisobutylonitrile-type. Representative of various organic hydroperoxides are cumine hydroperoxide, isopropyl benzene hydroperoxide, tertiary butyl hydroperoxide and para methane hydroperoxide. Representative of various inorganic peroxides are hydrogen peroxide, as well as ammonium, sodium and potassium persulfate.

The composition of this invention, comprised of the low profile butadiene/styrene copolymer and tackifier resin, generally suitable as an adhesive, can be conveniently prepared by mixing the butadiene/styrene copolymer with a suitable tackifying resin in the presence of a volatile organic solvent. The mixing is usually accomplished at a temperature in the range of about 0° C. to about 100° C., and more typically from about 20° C. to about 60° C., but between the freezing point and the boiling point of the mixture. Various aliphatic and aromatic hydrocarbons can be used for this purpose. Representative of various aromatic hydrocarbons include toluene, benzene and xylene and representative of various aliphatic hydrocarbons include pentane, hexane, heptane and octane. A particularly suitable hydrocarbon solvent is a mixture of aromatic and aliphatic hydrocarbons such as, for example, a mixture of about 10 to about 90 weight percent toluene and correspondingly about 90 to about 10 weight percent hexane. Such an adhesive mixture can then suitably bond substrates together such as by simply applying it to substrate surfaces, adhering the surfaces with a thin film of the mixture therebetween, and drying the mixture. Preferably, the mixture is applied to at least one of the substrate surfaces, followed by partially drying it by evaporation to enhance its tack and bringing the substrate surfaces together with the application of pressure while the film of adhesive mixture is maintained therebetween and drying said adhesive to enhance the bond.

The composition of this invention has particular utility as a pressure-sensitive adhesive. For example, pressure-sensitive tapes can conveniently be prepared by applying the mixture comprised of a solution of the adhesive composition to a flexible substrate and drying the mixture. For this purpose, generally a thickness of the composition on the flexible substrate in the range of about ½ to about 2 mils is satisfactory.

The adhesive composition of this invention can also have utility as a hot melt pressure-sensitive adhesive, particularly when prepared by mixing the butadiene/styrene copolymer, tackifying resin and a minor amount of an oil such as petroleum-derived or coal tar-derived oil. Particularly suitable is mineral oil. The hot melt adhesive is simply applied by heating the mixture, applying it to a substrate and cooling.

In the preparation of the butadiene-styrene/tackifying resin adhesive composition of this invention, it is understood that minor amounts of various antioxidants, pigments and fillers can be added and mixed therewith to enhance its aging characteristics and physical properties.

In the practice of this invention, various tackifying resins can be used. It is generally preferred that they have an average softening point, according to ASTM No E28-58T, in the range of about 70° C. to about 140° C. and more preferably about 80° C. to about 115° C. Representative of such tackifying resins are the well known rosin esters, particularly hydrogenated rosin esters, and diolefin-olefin polymers containing about 5 to about 35, preferably about 10 to about 30, weight percent aromatic groups. Such diolefin-olefin resins are prepared by polymerizing in the presence of a Friedel-Crafts catalyst, a monomer mixture comprised of a diolefin such as piperylene along with at least one methyl branched chain $\alpha$ or $\beta$ monoolefin containing 4 to 6, preferably 5 to 6, carbon atoms, where the mole ratio of diolefin to monoolefin is in the range of about 0.8/1 to about 2/1 in combination with about 5 to about 10 weight percent of a monomer selected from styrene and $\alpha$-methyl styrene and about 0 to about 10 weight percent dicyclopentadiene, based on the total monomer mixture. Aluminum chloride and ethylaluminum dichloride are preferred catalysts although boron trifluoride and boron trifluoride etherate can be used with a large sacrifice in softening point in some cases. Particularly representative of such monoolefins are isobutylene, 2-methyl-1-butene, 2-methyl-2-butene, 3-methyl-1-butene, 2-methyl-1-pentene and 2-methyl-2-pentene. The 5 carbon atom containing 2-methyl-1-butene and 2-methyl-2-butene are preferred. Generally a hydrocarbon diluent is used during the polymerization which is generally conducted at about 20° C. to about 50° C., after which the resin product is recovered, typically by steam stripping.

The rosin ester resins are generally characterized with an acid number less than about 20, preferably less than about 15.

The practice of this invention is further illustrated by reference to the following examples which are intended to be representative rather than restrictive of the scope of the invention. Unless otherwise indicated, all parts and percentages are by weight.

EXAMPLE I

A butadiene/styrene copolymer was prepared according to the following recipe shown in Table 1:

TABLE 1

| Compound | Parts |
|---|---|
| 1,3-butadiene | 73 |
| Styrene | 27 |
| Acrylonitrile | 1 |
| Water | 215 |
| Emulsifiers | 5 |
| Modifier (mercaptan) | 0.45 |
| Short Stop | 0.2 |

For the preparation of the butadiene/styrene copolymer, a reactor was charged 215 parts water, 5 parts emulsifier, 0.35 parts modifier, 73 parts 1,3-butadiene, 26 parts styrene and 1 part acrylonitrile. The mixture was adjusted to a temperature of about 30° C. and 0.05 part of cumene hydroperoxide free radical initiator catalyst was added. The copolymerization was allowed to proceed until about 60 percent of the butadiene, styrene and acrylonitrile monomers had reacted. At this time, the remainder of the styrene and modifier was added. The reaction was allowed to continue for additional 4 hours at a temperature of about 30° C. until an overall conversion of the monomer had taken place. The reaction was stopped by the addition of the shortstop and the mixture poured onto a drying tray from which the water was evaporated. The resulting relatively sticky butadiene/styrene copolymer was analyzed to have an ultimate tensile of about 60 psi and an ultimate elongation of about 1200 percent to about 25° C. The tensile strength was determined on an Instron tester with a cross head speed of about 2 inches per minute. The overall yield of butadiene/styrene copolymer was 85 parts or 85 percent.

EXAMPLE II

An adhesive composition was prepared by mixing 70–90 parts toluene, 15 parts of a butadiene/styrene copolymer prepared according to the method of Example I and about 15 parts of a resin selected from a rosin ester (obtained as Staybelite ester No. 10 from the Hercules Incorporated company) or piperylene/2-methyl-2-butene/α-methyl styrene/dicyclopentadiene resin having a softening point of about 75° C. to about 90° C. Separate mixtures of toluene, copolymer and resin tackifiers are identified herein as Experiments A and B. A third experiment, identified herein as Experiment C, is included herewith which simply substitutes natural rubber of U.S. pale crepe No. 1 for the butadiene/styrene copolymer. It is intended as a comparative control.

The actual mixtures were prepared at a temperature of about 25° C. with adequate mixing overnight. With the mixture was included 1 part of phenol-type antioxidant for the purpose of aging properties. The resulting mixture was poured onto a polyester film substrate and dried to form an adhesive composition having a thickness of about 1.5 mils. The adhesive composition was then examined for its suitability as a pressure sensitive adhesive by measuring its rolling ball tack, 180° peel strength, 90° peel strength and shear adhesion both in its initial unaged condition and after aging 7 days at about 70° C. The comparative results of the tests, show the ability to completely substitute the especially prepared butadiene/styrene copolymer for natural rubber for the purpose of preparing the adhesive composition of this invention. The recipes and test results are shown in the following Tables 2 and 3.

TABLE 2

| Compound | RECIPE Experiments and Parts | | |
|---|---|---|---|
| | Exp A | Exp B | Exp C |
| SBR[1] | 15 | — | — |
| Rubber (Example I)[2] | — | 15 | — |
| Natural Rubber[3] | — | — | 12.5 |
| Diolefin/Olefin Resin[4] | 15 | 15 | 15 |
| Antioxidant, phenolic | 0.15 | 0.15 | 0.125 |

TABLE 2-continued

| Compound | RECIPE Experiments and Parts | | |
|---|---|---|---|
| | Exp A | Exp B | Exp C |
| Toluene | 70 | 90 | 75 |

[1] Rubber prepared by aqueous emulsion copolymerizing 1,3-butadiene and isoprene which contains about 23 percent styrene, obtained as Plioflex 1551 from The Goodyear Tire & Rubber Company
[2] Butadiene/styrene rubber of the type prepared according to the method of Example I
[3] Pale crepe No. 1 quality
[4] Piperylene/2-methyl-2-butene/dicyclopentadiene/α-methyl styrene resin

TABLE 3

| Tests | TESTS Experiments | | |
|---|---|---|---|
| | Exp A | Exp B | Exp C |
| Rolling Ball Tack (inches) | 5.5 | 0.25 | 0.25 |
| 180° Peel Strength (oz) | 58 | 93 | 32 |
| 90° Peel Strength (hrs) (300 g/2 sq inches) | 5.25 | 2.75 | 1.25 |
| Shear Adhesion (hrs to failure)(500 g/0.5 sq in) | 22 | 4.25 | 1.5 |
| Shear Adhesion (°F. to failure)(1000 g/one sq in) | 169 | 358 | 151 |

| Exposed Film Tack (open atmosphere at about 25° C.) | | |
|---|---|---|
| Days | Tack Rating | |
| 3 | 2 | 1 | 1 |
| 5 | VL | 1 | 2 |
| 7 | N | 1 | 2 |
| 10 | N | 1 | VL |
| 12 | N | 1 | VL |
| 17 | N | 1 | N |
| 18 | N | 1 | N |

1 - Rating of "1" is most tack, "VL" is very little tack and "N" is essentially no tack In this example the 180° peel strength tests were conducted according to Method PSTC-1, revised in April of 1966, of the Pressure Sensitive Tape Council. This method is found in the Fifth Edition of "TEST METHODS FOR PRESSURE SENSITIVE TAPES" developed by the Pressure Sensitive Tape Council, 1201 Waukegan Road, Glenview, Illinois. This test measures the average pull value required to peel the adhesive from the substrate at a 180° angle in pounds per one inch width of the test sample.

The tack and shear values were conducted according to Methods PSTC-6 and PSTC-7 of the Pressure Sensitive Tape Council. For example, the tack was measured by rolling a ball down an incline and onto a horizontally positioned sample. The distance in inches was measured which the ball travelled across the sample. Thus, the larger the value for this test, the smaller the amount of tack. The shear strength was measured by applying a 500 gram weight to the sample and measuring the time in hours required for the tape to separate from the substrate.

In the 90° peel tests, the one inch wide tape sample is hung vertically downward at a 90° angle from a horizontal steel panel. A dead weight of 300 grams is attached to the lower end of the vertical portion of the tape and the data obtained as to hours to failure of a 2 square inch adhered surface of the tape to steel panel at about 25° C.

For the shear (°F to failure), one square inch of a one inch wide tape sample is adhered to and the tape vertically hung from a vertical steel panel. A 1000 gram dead weight is attached to the lower end of the tape. The temperature was slowly incrementally increased and the temperature recorded at the point of failure.

In the practice of this invention, it has been taught that mercaptan modifiers are desired in order to enhance the production of the low level physical properties of the rubbery copolymers. In practice, although primary and tertiary mercaptans are prescribed, secondary mercaptans can be used. However, it is preferred that primary mercaptans are used because they tend to inhibit gel formation, although they react very quickly, with the tertiary mercaptans then being used with their substantially lower rate of reaction. In further practice, generally about 2 to about 5 or more, even up to about 7 or 8 percent of such modifier can be used, based on the total monomer amount. Generally, the primary mercaptan is initially added in a step-wise emulsion copolymerization process with the tertiary mercaptan being added along with the additional styrene in the later incremental polymerization step.

Also, in the practice of this invention, it should be understood that additional tackifiers can be used in combination with the primary described tackifying resins, although the general result would typically be one of dilution of the primary required properties, including softening point range of the tackifier. Thus, for example, coumarone-indene-type and petroleum-derived type resins can be used, in some instances in admixture with the primary required resin tackifiers, as long as softening point of the combination remains in the required range.

While certain representative embodiments and details have been shown for the purpose of illustrating the invention, it will be apparent to those having skill in this art that various modifications and changes may be made therein without departing from the spirit or scope of the invention.

What is claimed is:

1. A pressure sensitive adhesive composition which comprises an admixture of (A) 100 parts by weight of the copolymer of butadiene, styrene and acrylonitrile and (B) about 50 to about 150 parts by weight of a tackifying resin selected from at least one of rosin esters and diolefin/olefin copolymers containing 5 to 35 weight percent aromatic units; where said tackifying resin is selected from hydrogenated rosin esters having an acid number of less than about 10 and from diolefin-olefin resins prepared by polymerizing in the presence of a catalyst selected from aluminum chloride and ethylaluminum dichloride, a monomer mixture comprised of piperylene along with at least one methyl branched chain α or β monoolefin containing 4 to 6 carbon atoms, where the mole ratio of diolefin to monoolefin is in the range of about 0.8/1 to about 2/1, in combination with about 10 to about 35 weight percent of at least one monomer selected from styrene and α-methyl styrene and about 0 to about 10 weight percent dicyclopentadiene, based on the total monomer mixture; and where said butadiene, styrene and acrylonitrile copolymer is characterized by having an ultimate tensile strength in the range of about 50 to about 100 pounds per square inch and an ultimate elongation in the range of about 600 to about 1200 percent at 25° C., and further characterized by a Mooney plasticity of about 25 to about 85, a benzene solution viscosity at a 4 weight percent concentration at 25° C. of about 10 to about 100 centipoises and a hexane solution viscosity at a 10 weight percent concentration at 25° C. of about 200 to about 2000 centipoises, prepared by the method which comprises (1) aqueous emulsion free radical polymerizing in the presence of a modifier composed of primary and/or tertiary mercaptans, a monomer mixture comprising about 3 to about 8 weight percent styrene, about 97 to about 92 weight percent 1,3-butadiene and about 1 to about 4 weight percent acrylonitrile based on 100 weight percent monomer mixture to a conversion of about 50 to about 75 weight percent of said monomers to a copolymer thereof, and (2) reacting an additional amount of about 2 to about 5 weight percent styrene, based on the total monmers used, with said copolymer to an extent of about 80 to about 98 weight percent conversion of the total monomers to a copolymer thereof, with additional mercaptan modifier.

2. The adhesive composition of claim 1 prepared by mixing said copolymer and said tackifier in the presence of at least one solvent selected from toluene, benzene, xylene, pentane, hexane, heptane and octane, where said tackifier resin is selected from fully hydrogenated rosin esters and from diolefin/olefin copolymers prepared by polymerizing in the presence of aluminum chloride, a mixture comprising piperylene, olefins selected primarily from 2-methyl-1-butene and 2-methyl-2-butene, at least one monomer selected from styrene and α-methyl styrene and about 0 to about 10 weight percent dicyclopentadiene.

3. The adhesive composition of claim 1 wherein said diolefin/olefin resin tackifier is prepared by polymerizaing piperylene with a methyl branched chain monoolefin containing 5 to 6 carbon atoms and has a softening point in the range of about 70° C. to about 140° C.

* * * * *